United States Patent [19]
Hamberg et al.

[11] Patent Number: 5,273,261
[45] Date of Patent: Dec. 28, 1993

[54] HYDRAULIC TORQUE STRUT WITH DECOUPLING AND RELATED MOUNTING SYSTEM

[75] Inventors: James P. Hamberg, Beavercreek; Todd H. Baldini, Dayton, both of Ohio

[73] Assignee: General Motors Corporation, Detroit, Mich.

[21] Appl. No.: 870,383

[22] Filed: Apr. 17, 1992

[51] Int. Cl.$^5$ .................... F16M 1/00; B62D 21/00
[52] U.S. Cl. .......................... 267/140.12; 267/219; 267/140.5; 180/312
[58] Field of Search ................ 267/292–294, 267/35, 140.12, 140.13, 140.4, 140.5, 141.1–141.7; 248/562, 636, 638; 180/300, 312

[56] References Cited

U.S. PATENT DOCUMENTS

| | | | |
|---|---|---|---|
| 4,709,898 | 12/1987 | Yoshida et al. | 267/140.13 |
| 4,838,529 | 6/1989 | Orikawa et al. | 248/562 |
| 4,881,712 | 11/1989 | Lun | 248/562 |
| 4,942,947 | 7/1990 | Shtarkman | 188/267 |

FOREIGN PATENT DOCUMENTS

| | | | |
|---|---|---|---|
| 0286633 | 12/1986 | Japan | 248/562 |
| 132049 | 6/1987 | Japan | 267/140.12 |
| 2200047 | 9/1987 | Japan | 267/140.12 |

Primary Examiner—Robert J. Oberleitner
Assistant Examiner—Chris Schwartz
Attorney, Agent, or Firm—Ronald L. Phillips; A. Michael Tucker

[57] ABSTRACT

A mounting system incorporating a hydraulic torque strut provides torsional damping and noise suppression of vehicle engine vibrations. The strut includes a first mount connected to the engine and a second mount connected to the frame of the vehicle. A rod rigidly connects the two mounts together. One or both of the mounts is a hydraulic mount. The hydraulic mount includes an elastomeric body that is connected to a mounting member and forms a cavity filled with damping liquid. An integral partition divides the cavity into two chambers. An orifice track in the partition provides fluid communication between the two chambers. Passage of damping liquid through the orifice track provides damping action. Further, in order to provide decoupling for vibration isolation and noise suppression, a spool-type decoupler is mounted for reciprocal movement in the opening in the partition.

9 Claims, 2 Drawing Sheets

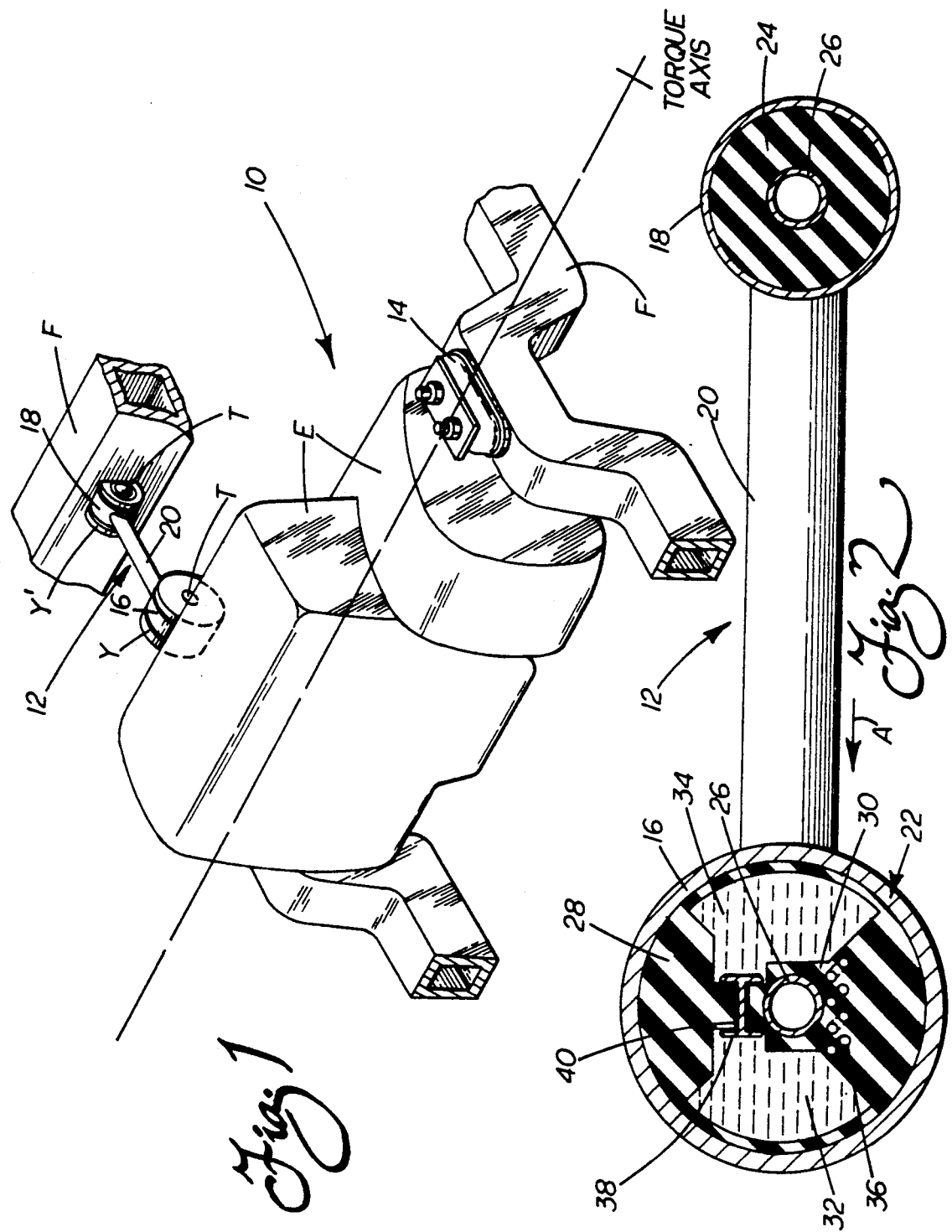

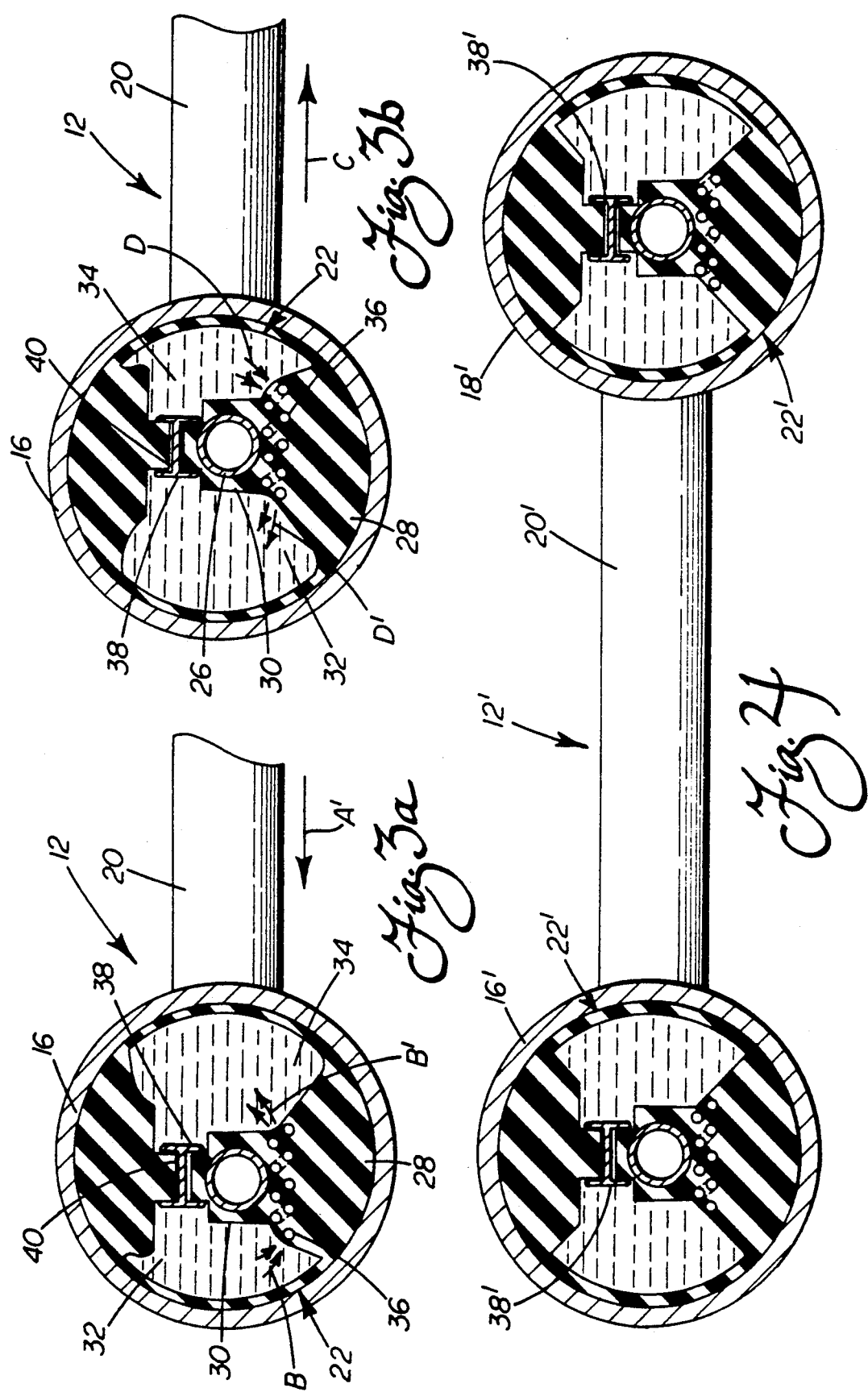

HYDRAULIC TORQUE STRUT WITH DECOUPLING AND RELATED MOUNTING SYSTEM

TECHNICAL FIELD

The invention relates generally to a torque strut and, more particularly, to a hydraulic torque strut and related mounting system for isolating vehicle engine/transmission vibrations, including torsional, pitching or rocking motion, from the vehicle frame.

BACKGROUND OF THE INVENTION

A variety of engine/transmission mounts and mounting systems for controlling the vehicle engine and isolating the vibrations during vehicle operation have been developed. One such system is disclosed in U.S. Pat. No. 4,881,712 to Lun entitled Hydraulic Mount, issued Nov. 21, 1989 and assigned to the assignee of the present invention. The system disclosed in this patent includes a pair of engine mount assemblies having elastomeric bodies including two longitudinally aligned integral engine mounts. The mounts are in fluid communication with one another via an integral orifice track molded as a groove at the interface between the elastomeric body and a mating base plate. The engine mount assembly is mounted on a vehicle frame such that the common axis of the hydraulic chambers is situated transversely to the torque axis of the engine.

During operation, the engine is subjected to torsional movement or pitching about this torque axis. This torsional or pitching action of the engine causes one end mount of each assembly to compress forcing hydraulic fluid along the orifice track into the other mount. The other mount simultaneously expands and receives this excess fluid. Advantageously, the flow of fluid along the orifice track produces a desired damping effect of the vibration, including the torsional motion, to provide isolation from the vehicle frame.

The mounting system disclosed in the Lun patent is completed by the provision of a basic torque strut mounted between the top of the engine and the cross frame member to prevent excessive torsional motion. The torque strut comprises a single rigid piece vibrationally isolated from the engine and frame at its ends by rubber bushings. The torque strut and related engine mount assembly work in concert to provide acceptable control of the engine, as well as suitable isolation of the entire range of vibrations. However, in some vehicle/engine combinations, it is difficult to obtain the desired damping for certain vibrations, such as in the relatively high amplitude, low frequency range, especially when the torque strut is designed primarily for engine control. Also, some idling roughness can occur, due to the inability to decouple the strut.

Thus, while it can be said that the mounting system disclosed in the Lun patent is proven to be successful, it has been discovered that further improvements are needed. As indicated, a common diagnosis of problems in a vehicle is that resonant high amplitude, low frequency vibrations are present. In these cases, vibration isolation needs to be improved beyond what can be implemented by tuning of the main engine mount assemblies. Specifically, it has been found that for some engine/vehicle combinations, tuning of the torque strut to provide less damping, and thus a softer, overall torsional dynamic rate is needed for maximum performance. It is, of course, desirable to find a way this enhancement can be implemented without unduly sacrificing engine control or increasing the noise. Also, when resonant low amplitude, high frequency torsional vibrations are a problem, it is desirable to effect a decoupling of the torque strut.

Accordingly, a need exists for an improved torque strut and related mounting system for both controlling the engine and isolating vibrations, including particularly a full range of torsional displacements. Similarly, a need exists for a torque strut of improved design providing operating characteristics that may be tuned in order to achieve the most efficient and effective balance between control of engine motion and vibration isolation. Particular attention is also to be paid to torque decoupling during engine idle operation and increased damping capability of high amplitude, low frequency inputs. The torque strut and related mount assemblies should be matched to essentially eliminate any significant torsional vibration that would otherwise be transmitted through the vehicle frame to the passengers riding in the vehicle.

SUMMARY OF THE INVENTION

Accordingly, it is a primary object of the present invention to provide a new and improved torque strut and related vehicle component mounting system, including an integral hydraulic damping insert in the torque strut of relatively simple and inexpensive construction.

Another object of the present invention is to provide a hydraulic torque strut and mounting system of compact configuration that is relatively easy and economical to install, and at the same time is highly versatile and readily adapted to a variety of engine applications.

Yet another object of the invention is to provide a hydraulic torque strut with an orifice track and integral decoupler that may be tuned to dampen troublesome or resonant high amplitude, low frequency vibrations.

Yet another object is to provide such a torque strut having a relatively soft dynamic rate at resonant frequencies without sacrifice of effective engine or noise control, and a related system including the strut and a mount assembly of matched performance characteristics.

Still another object is to provide a soft dynamic rate torque strut, and related system, that is particularly effective to suppress high amplitude, low frequency vibration so as to minimize torsional or pitching motion of the vehicle engine during operation. Additionally, the hydraulic torque strut and system provides the desired decoupling of the hydraulic system to ensure no damping at the lowest amplitude, high frequency vibrations, such as occur during smooth idle. As a result, over a wide range of vibrations and torsional movements, there is a minimum of transmission of vibrations or shake through the vehicle frame to the passengers in the vehicle. These objectives are accomplished while maintaining in the balanced overall system a relatively high dynamic torque rate when needed. This assures adequate control of the engine motion, suppression of noise, reduction to powertrain abuse, such as during heavy braking or rapid acceleration, and improved transmission smoothness during shifting. Accordingly, improved rider comfort in the vehicle is provided.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, a hydraulic torque strut is provided for damping and isolating the torsional or pitching motion of an engine during vehicle operation. The torque strut includes a "dog bone" assembly formed of metal such as aluminum. The dog bone assembly comprises a solid metal rod connecting a pair of tubular rings.

A mount is held in each ring. The first mount is adapted for connection to the engine. The second mount is adapted for direct connection to the frame or to a component, such as a cross frame member for support.

In one embodiment of the invention, one of the mounts is a hydraulic damping insert. The other may, for example, be a rubber bushing. Advantageously, the provision of a hydraulic damping insert at one end of the torque strut allows the damping and isolation characteristics of the strut mount to be more closely tuned to match the operation of the engine, for which motion control and noise suppression are desired. Further the provision of the smaller rubber bushing at the opposite end of the torque strut increases the packaging flexibility significantly. More specifically, the smaller overall size of such a torque strut allows the use of the device even in compact vehicles where limited space within the engine compartment forecloses other possible design options.

The hydraulic damping insert includes a mounting member, such as a metal sleeve for receiving a through bolt. An elastomeric body of natural or synthetic rubber is adhesively connected to the mounting member. The elastomeric body forms a sealed cavity that is filled with damping liquid. A partition is provided in the cavity within the elastomeric body. The partition divides the cavity into a first chamber and a second chamber. Each of the chambers is formed between one face of the partition and the opposing interior wall of the elastomeric body.

The partition further includes a passage or orifice track providing fluid communication between the two chambers so as to effect damping. Further, in order to provide decoupling action for isolation of low amplitude, high frequency vibration and noise suppression, a decoupler is provided in an opening in the partition extending between the primary and secondary chambers. More particularly, the decoupler is mounted for reciprocating movement between a first seated position toward the first chamber and a second seated position toward the second chamber.

In response to relatively low amplitude torsional or pitching motion of the engine, a relatively small contraction is induced in the first chamber of the hydraulic bushing. Accordingly, the volume of the first chamber is decreased and damping liquid is forced around the decoupler through the decoupler opening into the second chamber. As this occurs the decoupler moves toward the second chamber which undergoes a proportional increase in volume. Upon reversal of the applied force, the volume of the second chamber is decreased and damping liquid flows back around the decoupler through the decoupler opening into the first chamber. This causes the decoupler to move back toward the first chamber.

It should be understood that for low amplitude vibrations, the decoupler reciprocates back and forth between the chambers within a narrow range of movement without becoming seated. Accordingly, little or no damping occurs as flow through the orifice track is substantially avoided. This results in excellent isolation of small amplitude, high frequency vibrations, such as commonly occurs at idle. Noise suppression is thereby maximized for increased passenger comfort.

In contrast, in response to high amplitude vibrations, the first chamber undergoes a significant compression. This compression forces damping liquid around the decoupler through the decoupler opening until the decoupler becomes seated toward the second chamber. Once seated, damping liquid is forced to flow through the orifice track into the second chamber. Of course, the orifice track may be formed to a selected length and/or width so as to provide the mount with desired damping properties. In fact, the track may assume a spiral configuration to allow greater flexibility in tuning the dynamics of the torque strut. More particularly, such a configuration allows a longer length track and/or a track of increased cross-sectional area to be provided within the limited space of the partition. This allows for enhanced damping of high amplitude, low frequency inputs within a specific range of resonance frequencies.

On reversal of the vibratory force, that is release of the compressive force, the secondary chamber decreases in volume and damping liquid begins to flow around the decoupler through the decoupler opening into the first chamber. Once the decoupler seats toward the first chamber, damping liquid flow is limited to that provided through the orifice track. The increased resistance to flow along the orifice track and the inertial effects of the liquid column within the track provide effective damping action. As indicated above, this damping action may be tuned to be most effective to control pitching about the torque axis of the particular engine arrangement to which the torque strut is being applied and matched to the main engine mount assemblies, which may even be basic rubber mounts.

In accordance with a second embodiment of the invention, a hydraulic damping insert may be provided at each end of the torque strut for connection to the engine and vehicle frame. Advantageously, either embodiment of the torque strut disclosed provides a high degree of damping to torsional loading to provide enhanced engine control. Accordingly, the strut is particularly well suited for use with front wheel drive vehicles having a transversely mounted engine/trans-axle assembly. Further, either embodiment provides the necessary decoupling to also ensure the desired isolation of small amplitude, high frequency vibrations that would otherwise be transmitted through the vehicle frame to the annoyance of the passengers in the vehicle.

It should be understood that the torque strut is also well adapted for use with longitudinally mounted engines for rear wheel drive vehicles. Of course, the size of the torque strut, the cross sectional area and/or range of movement of the decoupler and the dimensions of the orifice track may be varied to suit the particular vehicle and engine application. Because of these features the torque strut may be easily and economically adapted to a wide range of vehicles while providing tuned isolation and damping characteristics for optimum performance under most operating conditions.

In accordance with yet another aspect of the invention, the torque strut described may be utilized as an integral component of a complete hydraulic mounting system. Such a system includes main hydraulic, elastomeric mount assemblies for supporting the engine or engine/trans-axle assembly on the vehicle frame. Advantageously, the performance characteristics of the mount assemblies and the torque strut are balanced and matched to provide optimal control of engine motion and particularly high amplitude, low frequency rocking or pitching motion about the torque axis of the engine. Further, this is achieved while still providing a softer, overall torsional dynamic rate for isolating certain low amplitude, high frequency torsional vibrations that often occur during engine idle. The desired noise suppression is also provided.

Stated another way, the balanced mounting system provides enhanced performance properties that may be tuned to provide optimum performance over a wider range of vehicle operating conditions. Peak damping activity is provided for improved engine control in response to high amplitude vibrations at key resonance frequencies. Conversely, decoupling is provided when required in response to low amplitude, high frequency vibrations. This results in isolation of those vibrations from the vehicle frame and, therefore, improved rider comfort. Further, smoother operation is provided during sharp power transients such as occur during shifting with the vehicle under hard acceleration. The resulting reduction of stress and strain applied to vehicle components also enhances the expected service life of those components.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification, illustrates several aspects of the present invention and together with the description serves to explain the principles of the invention. In the drawing:

FIG. 1 is a perspective view of the hydraulic torque strut of the present invention showing an engine including a trans-axle supported in a vehicle frame;

FIG. 2 is a partially sectional view of a first embodiment of the torque strut of the present invention;

FIGS. 3a and 3b are fragmentary detailed views of a hydraulic damping insert utilized at one end of the torque strut of the present invention showing the torque strut, respectively, in tension and in compression; and FIG. 4 is a side elevational view of a second embodiment of the present invention including a hydraulic damping insert at each end.

Reference will now be made in detail to the present preferred embodiment of the invention, an example of which is illustrated in the accompanying drawing.

DETAILED DESCRIPTION OF THE INVENTION

Reference is now made to FIG. 1 showing a hydraulic engine mounting system 10 and illustrating the preferred embodiment of the hydraulic torque strut 12 of the present invention. More particularly, the mounting system 10 is adapted for mounting a transverse engine E including a trans-axle, as found in front wheel drive vehicles. In addition to the torque strut 12, one or more engine mount assemblies 14 may be provided at each end of the engine E (only one shown) in a manner known in the art to provide vertical support of the engine on the frame F. The torque strut 12 and engine mount assemblies 14 work in concert to isolate the vibration/torsional motion of the engine E from the vehicle frame F.

Each of the engine mount assemblies 14 may, for example, be of the design disclosed in U.S. Pat. No. 4,588,173 to Gold et al. assigned to the assignee of the present invention. Of course, other hydraulic, elastomeric mount designs tuned and matched to provide the desired performance characteristics may also be utilized. Solid rubber mounts can be utilized if desired, in accordance with the broader aspects of the invention.

A first embodiment of the torque strut 12 of the present invention is shown in FIG. 2, and comprises an aluminum dog-bone construction including a pair of tubular rings 16, 18 connected together by a rod 20. As shown, the ring 16 houses a hydraulic damping insert generally designated by reference numeral 22. An annular flange or disc (not shown), fastened to the ring 16 in any known manner, partially closes each open side of the ring. The discs engage the sidewalls of the bladder-like insert 22 to control sidewall loading and prevent bulging that could otherwise adversely effect the performance of the insert. In contrast, the ring 18 houses a solid rubber bushing 24. The solid rubber bushing 24 is smaller than the hydraulic damping insert 22 thereby reducing the overall size of the torque strut 12. This is an important consideration that allows the torque strut 12 to be utilized in compact vehicles where space limitations play a critical role in vehicle design.

Both the hydraulic insert 22 and solid rubber bushing 24 include a metal mounting member 26 in the form of a sleeve adapted to receive a through-bolt in a freely pivotal manner. Together, the through-bolts and mounting members 26 allow the torque strut 12 to be mounted, for example, between the block of the engine E and the vehicle frame F (see FIG. 1). More particularly, the insert and bushing 22, 24 are received, respectively, in the cooperating yokes Y, Y' on the engine E and vehicle frame F. The through-bolt T is then passed through each yoke Y and the mounting member 26, and secured in position. The resulting dual pivotal connection and positioning of the torque strut 12 provide for maximum control of the torsional movements of the engine E relative to the frame F. Further, as more clearly described below, this is achieved while assuring optimum vehicle ride characteristics including isolation of small amplitude, high frequency vibrations for increased rider comfort.

The construction of the hydraulic insert 22 will now be reviewed in detail. As shown in FIG. 2, the hydraulic insert 22 includes an elastomeric body 28 formed of synthetic or natural rubber that may be adhesively bonded or molded to the ring 16. The elastomeric body 28 forms a fully sealed cavity that is divided by an integral partition 30 into a first chamber 32 and a second chamber 34. Each of the chambers 32, 34 is formed between one face of the partition and the opposing face of the bladder wall of the elastomeric body 28.

A passage or orifice track 36 is provided in the partition 30 for fluid communication between the two chambers 32, 34 so as to effect damping. Preferably, the orifice track 36 is a spiral (note FIG. 2 cross-section showing spaced sections connected by curved passages, not shown). Such a configuration provides significant flexibility in tuning the damping characteristics of the torque strut 12 to meet the particular needs of any application. More particularly, an orifice track 36 of relatively long length may be provided, even in a relatively thin partition 30, by the utilization of a spiral passage with a relatively wide travel span. In contrast, a shorter length orifice track 36 may be provided by the utilization of a spiral with a narrow travel span. Additionally, it should be appreciated that the spiral configuration allows greater design flexibility in the selection of a cross-sectional area for the orifice track 36. This further aids in tuning the characteristics of the damping action to meet particular needs, especially when controlling high amplitude vibrations in the low frequency range.

In order to provide decoupling action for vibration isolation and noise suppression, a spool-type decoupler 38 may be provided. As shown, the decoupler 38 is mounted in a decoupler opening 40 that extends through the partition 30. As will be appreciated from the detailed comments set forth below, the decoupler reciprocates relative to the partition 30 between a first seated position toward the first chamber 32 and a second seated position toward the second chamber 34.

Advantageously, the spool type decoupler 38 shown in the drawing figures offers considerable design flexibility. More particularly, the decoupler face area and the extent of free travel space may be varied significantly to tune the isolation properties of the mount to meet the requirements of a specific application. For example, the operative area of the decoupler faces may be increased. This increases the responsiveness by presenting a larger surface for the rapidly flowing fluid to act against. This, in turn, serves to improve the isolation by extending the range of the low amplitude, high frequency vibrations affected.

During vehicle operation, the engine E pitches about its torque axis as the driver accelerates and decelerates the vehicle. Additionally, the engine pitches to a lesser extent during idle and other low load operation. As the engine pitches or rocks, the hydraulic insert 22 changes configuration from the neutral position shown in FIG. 2.

More particularly, in the preferred embodiment described with the hydraulic insert 22 within ring 16 being mounted on the engine E, as the engine pitches in a first direction such as away from the cross member F, the rod 20 tends to move so as to tension the rod 20, as shown by action arrow A in FIG. 2. However, the torque strut 12 is not actually placed in tension when the motion sensed is of a substantially low amplitude, high frequency variety. This results in an initial contraction of the first chamber 32, and as there is less resistance to flow through the decoupler opening 40 than the orifice track 36, flow through the orifice track 36 is substantially preempted as long as the decoupler opening remains open. The flow is quickly closed off by shifting of the decoupler 28 to the right. Thus, particularly at low amplitude and high frequencies, such as commonly associated with engine idle operation, decoupling action is provided, and the vibrations are isolated for best passenger comfort.

In contrast, for higher amplitude vibrations, such as commonly occur at lower frequencies, the rod 20' is tensioned (see action arrow A' in FIG. 3a), since the decoupler 38 is held by the flow of damping fluid in the seated position against the partition 30. As the decoupler opening 40 becomes sealed, all further flow of damping liquid from the first chamber 32 to the second chamber 34 (note FIG. 3a) must pass through the orifice track 36 (see flow arrows B, B'). As a result of the inertial effects of the liquid column in the orifice track 36 and the increased resistance to flow, significant damping is then provided to control and suppress the pitching of the engine.

By adjusting the length and cross-sectional area of the orifice track 36, the particular damping characteristics of the torque strut 12 is brought into balance with the performance characteristics of the mounting assemblies 14 and tuned to match the resonance frequency of the engine to be controlled. Accordingly, efficient and effective control of torsional motion is provided through the cooperative operation of the components of the mounting system 10.

Upon reversal of the pitching motion (note action arrow C in FIG. 3b), assuming the threshold of motion accommodated by the decoupler 38 as it shifts back to the left is reached, the torque strut 12 is placed in compression. This results in a controlled contraction of the second chamber 34 in accordance with the movement of the damping liquid to the first chamber 32. As long as the decoupler opening 40 is sealed and damping liquid is forced to flow through the orifice track 36 (see flow arrows D, D'), the desired damping action is provided. This action thus provides the desired control of torsional motion of the engine E in this direction (engine moving toward the cross member F in FIG. 1).

FIG. 4 shows an alternative embodiment of the present invention wherein a hydraulic insert 22' is provided in each end ring 16', 18' of the torque strut 12'. These inserts 22, operate in the same manner as the insert 22 described above when the torque strut 12' is placed alternately in tension and compression. In certain applications where increased damping is required, the damping action of the strut can be increased, indeed doubled if necessary, by this use of two hydraulic inserts in tandem. Also, this allows greater tuning possibilities, such as providing the inserts 22' with different damping coefficients/rates and/or decouplers 38' acting at different threshold levels.

In summary, numerous benefits result from employing the concepts of the present invention. A mounting system 10 is provided that may be balanced and tuned to provide optimum vibration isolation and noise suppression characteristics. This is accomplished while also providing good control, particularly of torsional engine motion prevalent at start-up and during power transients in front-wheel drive vehicles having a transversely mounted engine/trans-axle assembly. This advantageously enhances the operating characteristics of the vehicle as well as passenger comfort. Further, this is achieved through the provision of a torque strut 12 with a hydraulic insert 22 of relatively simple and compact design. This is an important consideration in view of the relatively limited spaced in the engine compartments of today's compact, low hood line vehicles. Of still further benefit, the hydraulic insert 22 in the torque strut 12 also allows full decoupling and, hence, is particularly effective in isolating certain troublesome small amplitude, high frequency torsional vibrations that occur, particularly at engine idle.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as is suited to the particular use contemplated. All such modifications and variations are within the scope of the invention as determined by the appended claims when interpreted in accordance with breadth to which they are fairly, legally and equitably entitled.

We claim:

1. A hydraulic torque strut for torsional damping of a vehicle engine on the frame of a vehicle, comprising:
   a first mount connected to said engine;
   a second mount connected to said frame;
   means connecting said first and second mounts;
   one of said mounts including
   (i) an elastomeric body secured to and contained within a ring;
   (ii) a fluid-filled sealed cavity formed completely inside said elastomeric body;
   (iii) means for partitioning said cavity into a first chamber and a second chamber; and
   (iv) an orifice track in said partitioning means for providing restricted flow of damping liquid between said chambers; and
   the other of said mounts including a bushing secured to and mounted within a second ring.

2. A hydraulic torque strut for torsional damping of a vehicle engine on the frame of a vehicle, comprising:
   a first mount connected to said engine;
   a second mount connected to said frame;
   means connecting said first and second mounts;
   one of said mounts including
   (i) a mounting member;
   (ii) an elastomeric body connected to said mounting member having a sealed cavity completely within said body and filled with damping liquid
   (iii) means for partitioning said cavity into a first chamber and a second chamber;
   (iv) an orifice track in said partitioning means for providing restricted flow of damping liquid between said chambers; and
   (v) a decoupler on said partitioning means responsive to pressure variations in said first and second chambers.

3. The hydraulic torque strut set forth in claim 2, wherein said orifice track has a spiral configuration.

4. A hydraulic torque strut for torsional damping of a vehicle engine on the frame of a vehicle, comprising:
   a first mount connected to said engine;
   a second mount connected to said frame;
   means connecting said first and second mounts;
   said first and second mounts each including
   (i) a mounting member;
   (ii) an elastomeric body connected to said mounting member having a sealed cavity completely within said body and filled with damping liquid;
   (iii) means for partitioning said cavity into a first chamber and a second chamber;
   (iv) an orifice track in said partitioning means for providing restricted flow of damping liquid between said chambers; and
   (v) a decoupler on said partitioning means responsive to pressure variations in said first and second chambers.

5. The hydraulic torque strut set forth in claim 4, wherein said orifice track has a spiral configuration.

6. A hydraulic mounting system for a vehicle engine on the frame of a vehicle, and including hydraulic mounting means substantially supporting said engine on said frame, comprising:
   a hydraulic torque strut for torsional damping of said engine on said frame, said torque strut including a first mount connected to said engine, a second mount connected to said frame, means connecting said first and second mounts, and
   one of said mounts including
   (i) a mounting member;
   (ii) an elastomeric body connected to said mounting member having a sealed cavity completely within the body and filled with damping liquid;
   (iii) means for partitioning said cavity in said elastomeric body into a first chamber and a second chamber; and
   (iv) an orifice track in said partitioning means for providing restricted flow of damping liquid between said chambers; and
   the other of said mounts including a bushing secured to a second mounting member.

7. A hydraulic mounting system for mounting a vehicle engine on the frame of a vehicle, comprising:
   mounting assembly means for substantially supporting said engine on said frame; and
   a hydraulic torque strut for torsional damping of said engine on said frame, said torque strut including a first mount connected to said engine, a second mount connected to said frame, means connecting said first and second mounts, and
   at least one of said mounts including
   (i) a mounting member;
   (ii) an elastomeric body connected to said mounting member having a sealed cavity completely within the body and filled with damping liquid;
   means for partitioning said cavity into a first chamber and a second chamber;
   an orifice track in said partitioning means for providing restricted flow of damping liquid between said chambers; and
   a decoupler on said partitioning means responsive to pressure variations in said first and second chambers.

8. The hydraulic torque strut set forth in claim 7, wherein said orifice track has a spiral configuration.

9. The hydraulic torque strut set forth in claim 8, wherein the orifice track is configured to said strut to said mounting assembly means.

* * * * *